(12) United States Patent
Hara (10) Patent No.: US 9,240,198 B1
(45) Date of Patent: Jan. 19, 2016

(54) MAGNETIC DISK DRIVE AND WRITE CONTROL METHOD

(71) Applicant: Kabushiki Kaisha Toshiba, Minato-Ku, Tokyo (JP)

(72) Inventor: Takeyori Hara, Kawasaki Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/687,096

(22) Filed: Apr. 15, 2015

(30) Foreign Application Priority Data

Dec. 25, 2014 (JP) ................. 2014-261923

(51) Int. Cl.
*G11B 21/02* (2006.01)
*G11B 5/012* (2006.01)

(52) U.S. Cl.
CPC ..................... *G11B 5/012* (2013.01)

(58) Field of Classification Search
CPC .. G11B 2220/90; G11B 27/07; G11B 21/106; G11B 5/5526; G11B 5/59627; G11B 5/012; G11B 5/59633; G11B 5/59688; G11B 5/5547

USPC ................. 360/75, 72.2, 77.05, 77.06, 77.07, 360/78.14

See application file for complete search history.

(56) References Cited

U.S. PATENT DOCUMENTS

| | | | |
|---|---|---|---|
| 7,130,142 B2 | 10/2006 | Hara | |
| 8,587,889 B2 | 11/2013 | Kawabe | |
| 8,913,338 B1 * | 12/2014 | Chahwan | G11B 5/59627 360/55 |
| 2008/0266692 A1 | 10/2008 | Komoriya et al. | |

\* cited by examiner

*Primary Examiner* — Nabil Hindi
(74) *Attorney, Agent, or Firm* — White & Case LLP (57) ABSTRACT

According to one embodiment, a magnetic disk drive includes a disk including a plurality of servo areas for detecting a positioning error, a head to write and to read data, and a processor. The processor detects a current positioning error of the head on the disk, while writing data to tracks of the disk so as to partially overlap with each other, calculates a predicted positioning error in a next servo area, determinates write inhibit, based on comparison between the current positioning error and a first threshold value, sets the first threshold value to a smaller value being used as the first threshold value to determinate the write inhibit in the next servo area.

10 Claims, 7 Drawing Sheets

MAGNETIC DISK DRIVE AND WRITE CONTROL METHOD

CROSS-REFERENCE TO RELATED APPLICATIONS

This application is based upon and claims the benefit of priority from Japanese Patent Application No. 2014-261923, filed Dec. 25, 2014, the entire contents of which are incorporated herein by reference.

FIELD

Embodiments described herein relate generally to a magnetic disk drive and a write control method.

BACKGROUND

Recently, technology for writing tracks in a magnetic disk with high density has been developed. One of the technology is, for example, shingled write recording technology that partially overlaps and writes data to tracks. By using the shingled write recording technology, the tracks can be written with high density and a storage capacity can be increased.

According to the shingled write recording technology, in the adjacent recording regions of a first track and a second track which is partially overlapped and written to the first track, for example, When a positioning error of the first track occurs in a second track direction and/or When a positioning error of the second track occurs in the first track direction, the width of the first track is narrowed. When an amount of narrowing is great, data written in the first track may be overwritten or destroyed by data of the second track at the narrow portion.

When the data written in the first track is possibly overwritten or destroyed, write inhibit is determined and data writing is stopped. In this case, the write operation is restarted from a position where the writing has been stopped, after awaiting a magnetic disk making one round.

A positioning error of the head is detected at servo sector intervals and actual write inhibit is delayed from a detection of a current positioning error. Therefore, the currently written data may destroy the already written adjacent data in part, in the write inhibit determination based on the positioning error detected with a current servo sector. Since track pitch in an HDD of the shingled write recording technology can be narrowed as compared with that in an HDD of a conventional system, improvement in surface recording density can be realized. For this reason, write inhibit determination based on detection of drift-off (occurrence of positioning error exceeding a specific permissible value), in the HDD of the shingled write recording technology, is of higher importance of as compared with the HDD of the conventional system.

DETAILED DESCRIPTION

In general, according to one embodiment, a magnetic disk drive includes a magnetic disk comprising a plurality of servo areas for detecting a positioning error; a magnetic head to write and to read data to and from the magnetic disk; and a processor, wherein the processor detects a current positioning error of the magnetic head on the magnetic disk, while writing data to tracks of the magnetic disk so as to partially overlap with each other by the magnetic head, calculates a predicted positioning error in a next servo area to a current servo area where current positioning error is detected, executes write inhibit determination, based on comparison between the current positioning error and a first threshold value, and wherein when the current positioning error is equal to or smaller than the first threshold value, when the predicted positioning error is greater than a second threshold value different from the first threshold value, and when a direction of the predicted positioning error is same as a direction of the writing, the processor sets the first threshold value to a smaller value by a specific amount, the smaller value being used as the first threshold value in the write inhibit determination in the next servo area.

A magnetic disk drive and a write control method of embodiment will be described hereinafter with reference to the accompanying drawings.

Figure 1:
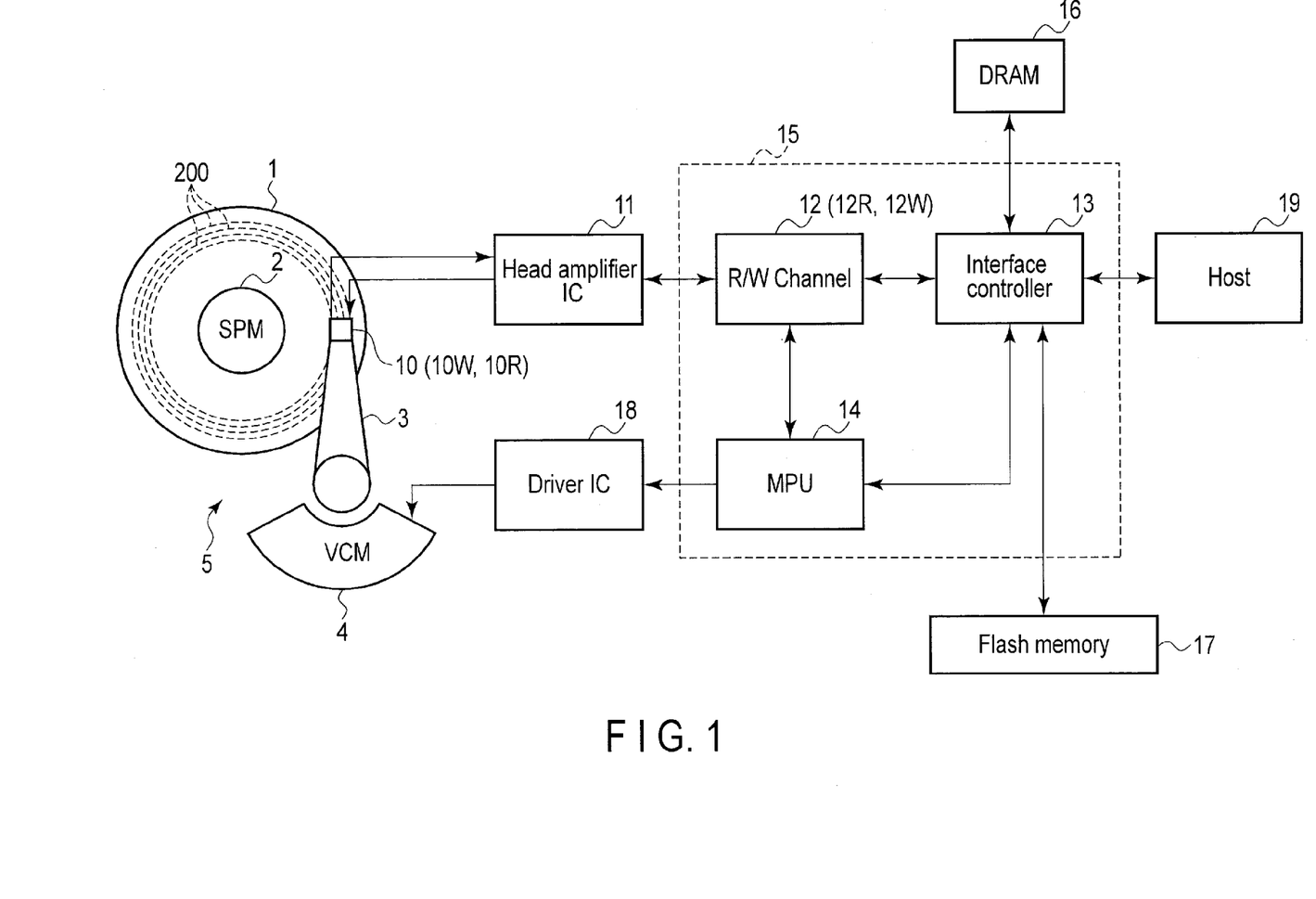
FIG. 1 is a block diagram showing components of a magnetic disk drive of embodiment.

FIG. 1 is a block diagram showing components of a magnetic disk drive of embodiment.

The magnetic disk drive of the embodiment comprises a head-disk assembly (HDA) 5, a head amplifier integrated circuit (hereinafter referred to as a head amplifier IC) 11, a system controller 15, a driver IC 18, etc.

The HDA 5 comprises a magnetic disk 1 as a storage medium, a spindle motor (SPM) 2, an arm 3 with a head 10 mounted thereon, and a voice coil motor (VCM) 4. The magnetic disk 1 is rotated by the SPM 2. A plurality of tracks 200 are defined on the magnetic disk 1, and each track respectively includes a plurality of data areas and servo sectors including burst information for detection of a positioning error, alternately. Each of the servo sectors is preliminarily written on the magnetic disk 1. The arm 3 and the VCM 4 constitute an actuator. The actuator is driven by the VCM 4 to control movement of the head 10 mounted on the arm 3 to a specified position on the magnetic disk 1. The VCM 4 is controlled to drive by a drive current (or voltage) from the driver IC 18.

The head 10 comprises a read head 10R and a write head 10W. The read head 10R reads servo patterns written in servo sectors on the magnetic disk 1. In addition, the read head 10R reads data written in the data areas on the magnetic disk 1. The write head 10W writes data in data areas on the magnetic disk 1.

The head amplifier IC 11 amplifies read signal read by the read head 10R, and transmits the read signal to a read/write (R/W) channel 12. In addition, the head amplifier IC 11 transmits a write current corresponding to write data output from the read/write (R/W) channel 12, to the write head 10W.

The system controller 15 is configured as a single-chip integrated circuit, and comprises the R/W channel 12, an interface controller 13, and a microprocessor (MPU) 14. The R/W channel 12 includes a read channel 12R and a write channel 12W. The read channel 12R executes demodulation of the read signal (output of the head amplifier IC 11) read by the read head 10R. The write channel 12W executes signal processing of the write data.

The interface controller 13 controls data transfer between a host 19 and the R/W channel 12. In addition, the interface controller 13 controls a buffer memory (DRAM) 16 and a flash memory 17 to read or write data.

The MPU 14 is a microcontroller, and constitutes a servo system which performs positioning control (servo control) of the head 10 by controlling the VCM 4 via the driver IC 18. Moreover, the MPU 14 controls the R/W channel 12 and the interface controller 13 to perform reading the data from the magnetic disk 1 or writing the data to the magnetic disk 1.

Next, a write control system and, particularly, a write inhibit determination system.

Figure 2A:
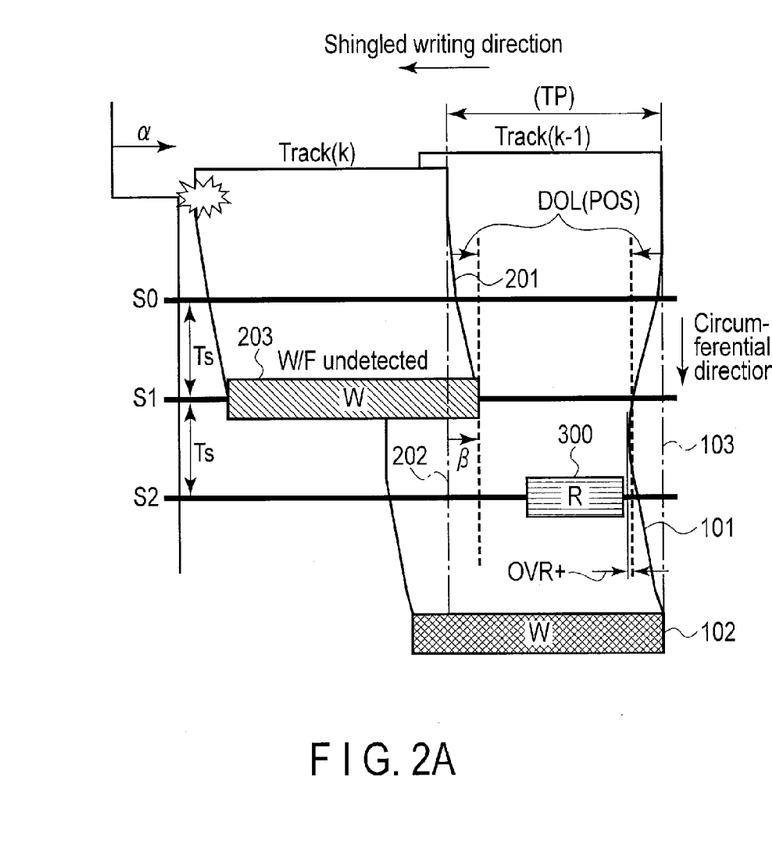
FIG. 2A shows illustrations for explanation of an occurrence mechanism of write-read offset peculiar to the magnetic disk drive of a first write inhibit determination system and a shingled write recording system.
Figure 2B:
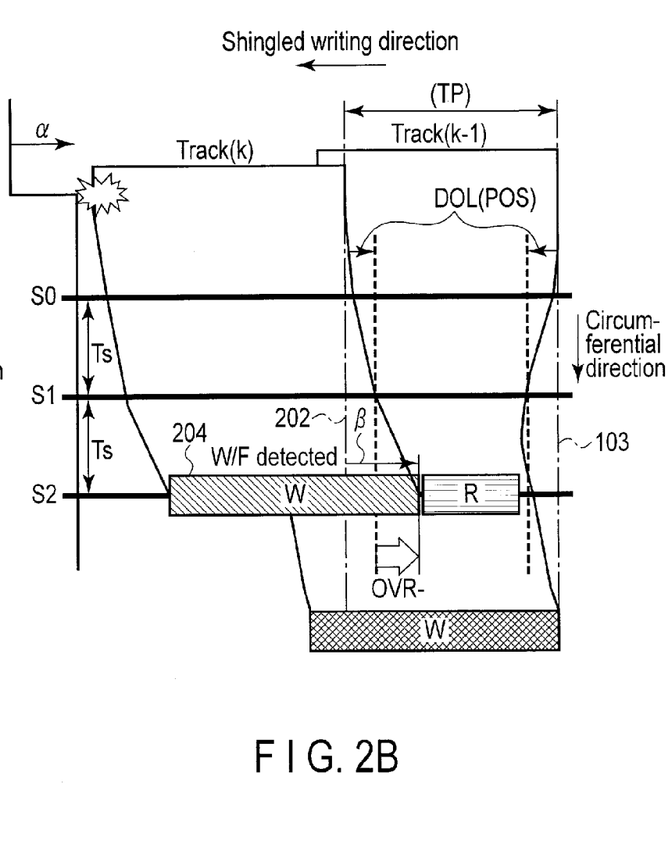
FIG. 2B shows illustrations for explanation of another occurrence mechanism of write-read offset peculiar to the magnetic disk drive of a first write inhibit determination system and a shingled write recording system.

FIGS. 2A and 2B shows illustrations for explanation of an occurrence mechanism of write-read offset peculiar to the magnetic disk drive of a first write inhibit determination system and a shingled write recording system. In addition, FIGS. 2A and 2B illustrates situations of executing shingled writing of a track (k) after writing a track (k−1). S0 to S2 indicate positions of the respective servo sectors, and Ts indicates a servo sector passage time interval.

In FIG. 2A, 101 indicates a track edge of the track (k−1) and 102 indicates the write head 10W. 201 indicates a track edge of the track (k). 103 indicates a target track edge of the track (k−1) and 202 indicates a target track edge of the track (k). α indicates disturbance and, when the disturbance is applied to the servo system, gap from the target track edge 202 emerges in a rightward direction in the figure (direction opposite to a shingled writing direction) at a locus of the write head 10W in the track (k).

203 indicates a position of the write head 10W at the time when the servo sector S1 is sampled (demodulated and a positioning error is detected), in the track (k), and is regarded as a sampled position of the servo sector S1. Thus, the positioning error obtained by sampling the servo sector is expressed as an amount of gap $\beta$ of the write head 10W, i.e., the sampled position 203 from the target track edge 202. The amount of gap $\beta$ is hereinafter explained as a positioning error $\beta$.

DOL(POS) indicates a first threshold value of write inhibit and, when the positioning error $\beta$ of the write head 10W exceeds the threshold value, data writing is inhibited. In the figure, the threshold value DOL(POS) on the right side indicates a threshold value to the track (k−1), and the threshold value DOL(POS) on the left side is a threshold value to the track (k). 300 indicates a relative position of the read head 10R at the time when the data of the track (k−1) is read. TP indicates a track pitch. The track pitch indicates a radial intercentral distance of track in general recording, and indicates a distance between track edges in shingled write recording.

In the sampled position 203 of the servo sector S1, writing is not inhibited since the positioning error $\beta$ of the write head 10W is equal to or smaller than the first threshold value DOL(POS). That is, a write fault (WF) is undetected.

Next, FIG. 2B shows a case where a relative position of the write head 10W to the magnetic disk 1 shifts from the sampled position 203 shown in FIG. 2A to a sampled position 204 of the servo sector S2. In this case, the positioning error $\beta$ of the sampled position 204 exceeds the first threshold value DOL(POS). Therefore, write inhibit is determined and the data write is stopped (WF detection). In this case, the data writing is started again from the servo sector before the position where the writing is stopped, after awaiting the magnetic disk 1 making one round.

When the data writing is stopped as shown in FIG. 2B, the maximum amount of deviation writing from the track (k) to the track (k−1) is

DOL(POS)+OVR−.

OVR− indicates an amount (overrun amount) at which the write head 10W exceeds and overruns the first threshold value DOL(POS), in a period from the time when the write head position is close to the threshold value DOL(POS), in the servo sector S1, to the time when the positioning error is detected in the servo sector S2 and the write is stopped. Here, "−" of OVR− indicates the overrun amount produced in the minus direction (i.e., a direction opposite to the shingled writing direction).

In contrast, the amount of deviation in the plus direction (shingled writing direction) of the track (k−1) is, as shown in FIG. 2A,

DOL(POS)+OVR+.

If it is detected that the write head exceeds the first threshold value DOL(POS) and performs writing at a certain time during writing, the data can be rewritten from one previous servo sector after the magnetic disk 1 has made one round. Therefore, the maximum value of OVR+ indicates an amount at which the write head overruns between sampling points when the positioning error is close to the first threshold value DOL(POS) in the servo sectors S1 and S2, and is a small value to OVR−.

Therefore, an inequality in which margin for deviation writing of the track pitch (TPIM) should be met since the data of the track (k−1) can be normally read is expressed as follows.

$$\text{TPIM} \geq 2 \times DOL(POS) + \text{OVR} \tag{1}$$

$$\text{where OVR} = \text{OVR}- + \text{OVR}+ \tag{2}$$

Next, a second write inhibit determination system will be explained.

Figure 3:
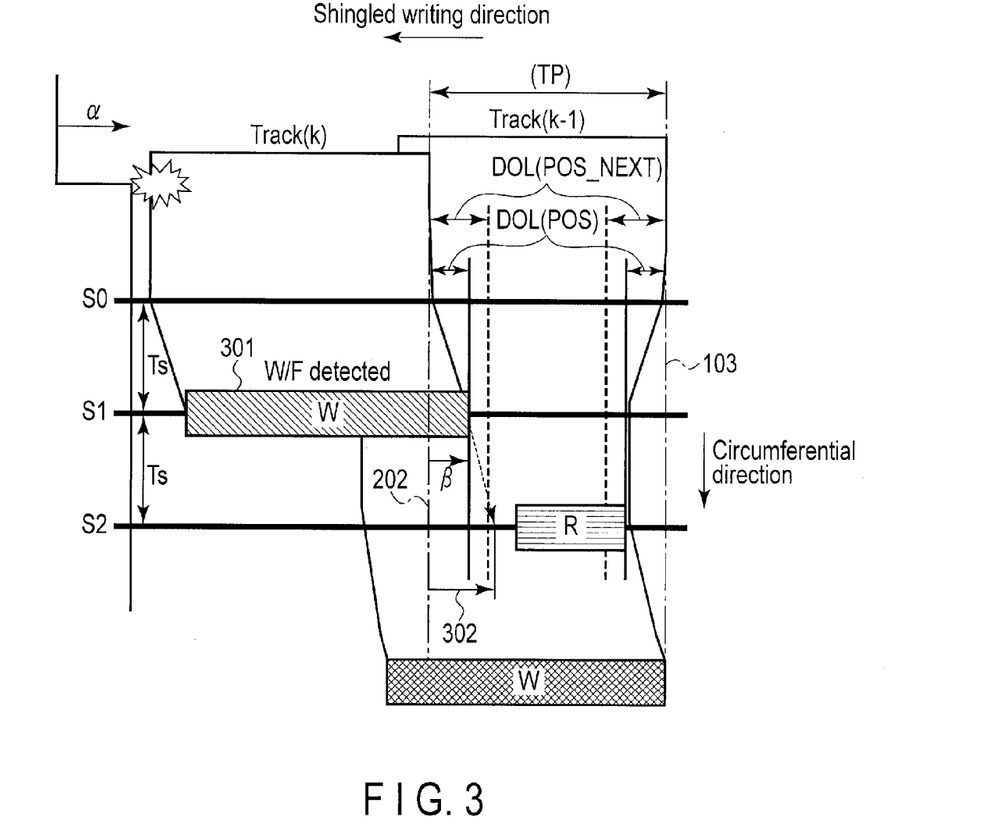
FIG. 3 is an illustration for explanation of a second write inhibit determination system.

FIG. 3 is an illustration for explanation of the second write inhibit determination system. FIG. 3 illustrates a situation of executing the shingled writing in the track (k) after the writing in the track (k−1), similarly to FIG. 2. In the track (k), the positioning error $\beta$ occurs in a rightward direction (i.e., a direction opposite to the shingled writing direction) in the figure.

301 indicates a sampled position of the servo sector S1 in the track (k). DOL (POS_NEXT) indicates a second threshold value of the write inhibit, which is a threshold value of a predicted positioning error 302 predicted to be detected in a following servo sector. The predicted positioning error 302 can be obtained in, for example, the following equation, based on the current positioning error and the positioning error in the previous servo sector.

$$xhat(k+1)=x(k)+vhat(k)*Ts \quad (3)$$

$$vhat(k)=(x(k)-x(k-1))/Ts \quad (4)$$

where
xhat(k+1): predicted positioning error,
x(k): current positioning error,
x(k−1): positioning error detected in the previous servo sector,
vhat(k): current, estimated radial speed.

In FIG. 3, the positioning error β of the sampled position 301 is equal to or smaller than the first threshold value DOL (POS). However, since the predicted positioning error 302 exceeds the second threshold value DOL(POS_NEXT), the write inhibit is determined (WF detected). Thus, the positioning error in the following servo sector S2 is predicted in the second write inhibit determination system. It is determined whether the writing is inhibited or not, based on the comparison between the predicted positioning error 302 and the second threshold DOL(POS_NEXT).

Next, a third write inhibit determination system of the embodiments will be explained.

FIG. 4A, FIG. 4B, FIG. 5A and FIG. 5B are illustrations for explanation of the third write inhibit determination system.

Figure 4A:
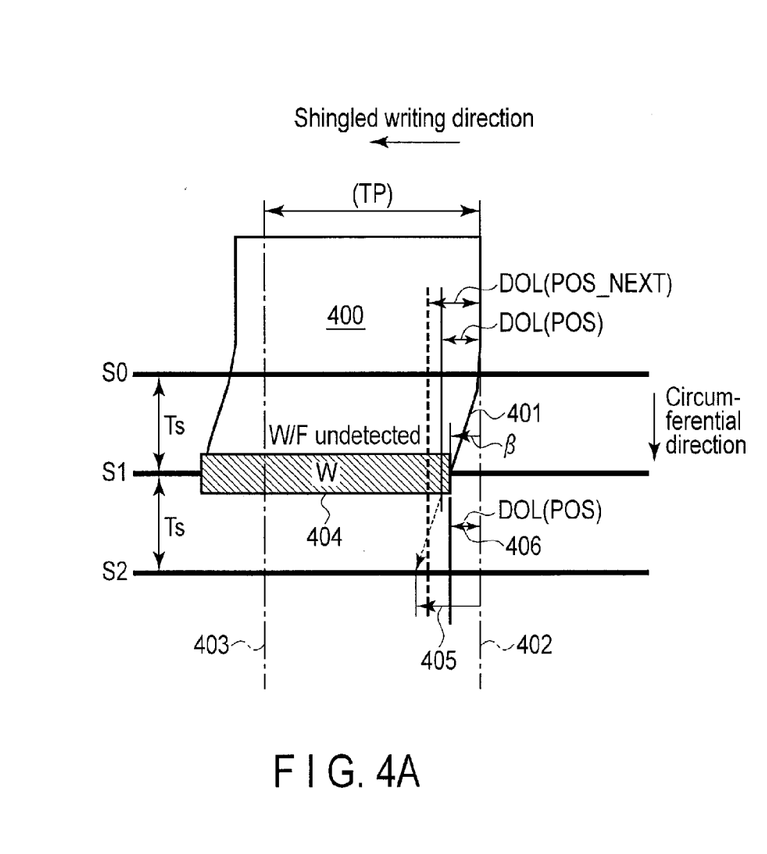
FIG. 4A shows illustrations for explanation of a third write inhibit determination system of the embodiment.

In FIG. 4A, 400 indicates a current track to be written and 401 indicates a track edge of the track 400. 402 indicates a target track edge of the track 400, and 403 indicates a target track edge of a track next to the track 400. 404 indicates a sampled position of the servo sector S1 in the track 400. Thus, in the track 400, the positioning error β occurs in a leftward direction (i.e., a direction similar to the shingled writing direction) in the figure.

When the position of the write head 10W is the sampled position 404, the positioning error β of the write head 10W does not exceed the first threshold value DOL(POS). However, a predicted positioning error 405 in the servo sector S2 previously located by one servo sector exceeds the second threshold value DOL(POS_NEXT). Furthermore, unlike the case shown in FIG. 3, a direction of the predicted positioning error is the same as the shingled writing direction. In this case, in the embodiments, the wrinting is not inhibited, but the first threshold value DOL(POS) applied in the servo sector S2 previously located by one servo sector is made strict (set to be a small value by a specific amount), similarly to a threshold value DOL(POS) 406. The strict threshold value DOL(POS) 406 is set to be a value smaller by, for example, approximately 20% than the first threshold value DOL(POS) to be made strict.

Figure 4B:
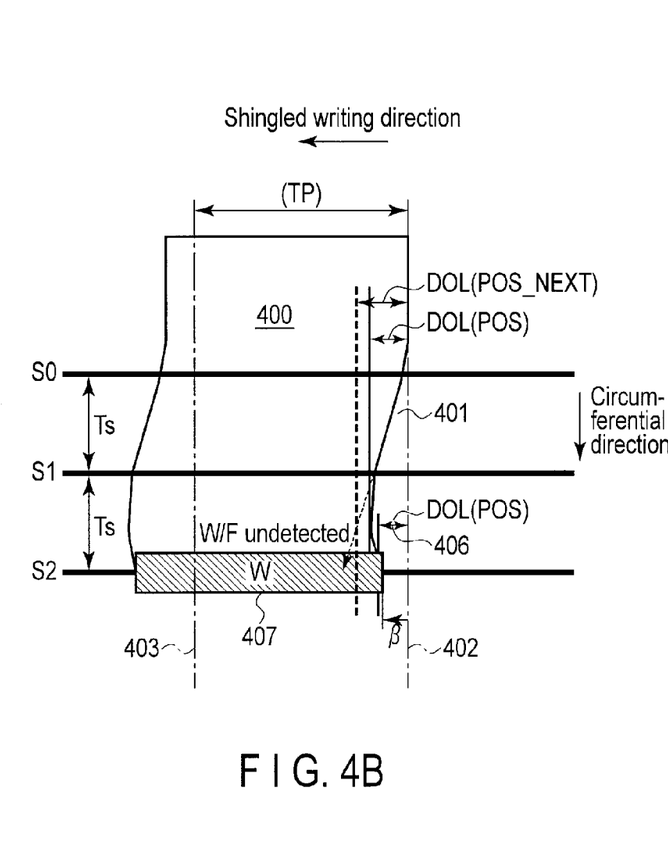
FIG. 4B shows illustrations for explanation of another sample of the third write inhibit determination system of the embodiment.

FIG. 4B shows a case where the relative position of the write head 10W to the magnetic disk 1 shifts from the sampled position 404 shown in FIG. 4A to a sampled position 407 of the servo sector S2. At this time, the positioning error β of the write head 10W is a value equal to or smaller than the strict threshold value DOL(POS) 406. Therefore, the writing is not inhibited (WF undetected) and the data writing is continued. In this case, a locus (track edge) of the write head 10W passes inside the original first threshold value DOL(POS), between the sampled positions of the servo sectors S1 and S2. Thus, it is assured that degradation of the performance of HDD caused by the write inhibit is suppressed and that the locus of the write head 10W passes inside of the original first threshold value DOL(POS). The overrun amount OVR+ in the same direction as the shingled write shown in FIG. 2A thereby becomes 0. Setting the overrun amount OVR+ to 0 is not a necessary condition, but the performance of the HDD can be improved or the capacity of the HDD can be explained as explained later, by decreasing the overrun amount OVR+.

Figure 5A:
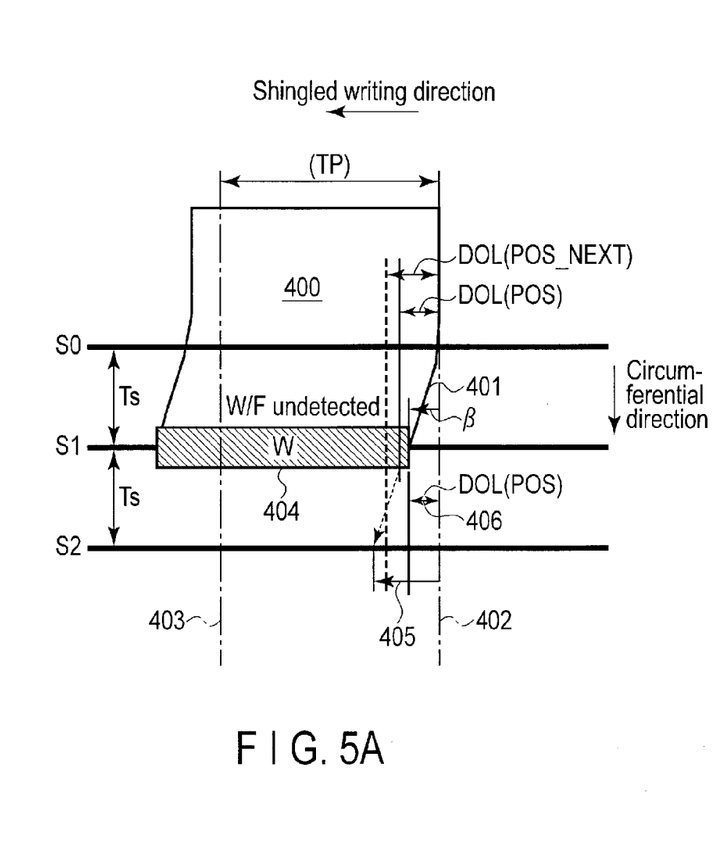
FIG. 5A shows illustrations for explanation of the third write inhibit determination system of the embodiment.
Figure 5B:
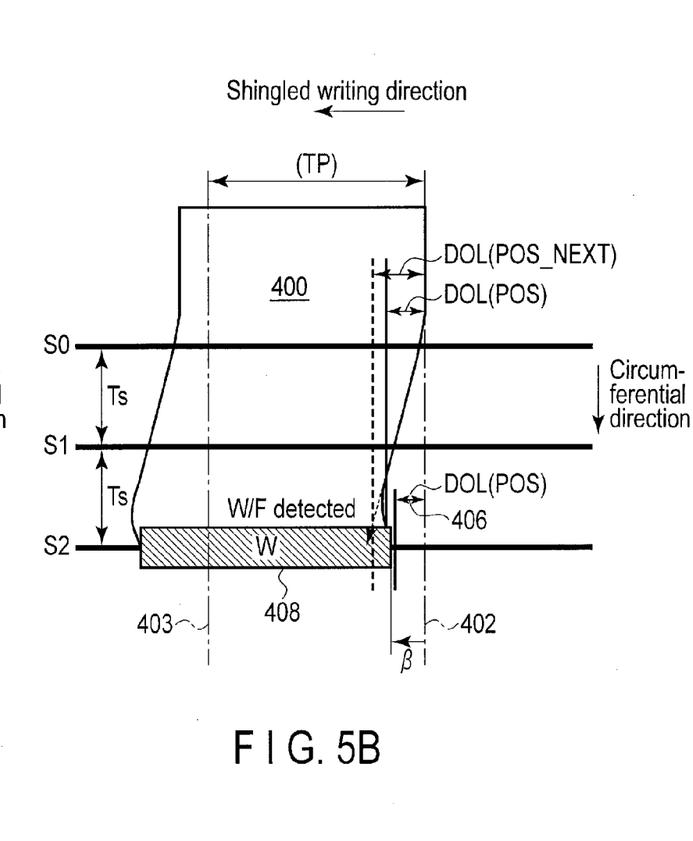
FIG. 5B shows illustrations for explanation of another sample of the third write inhibit determination system of the embodiment.

FIG. 5A is an illustration referred to in order to make FIG. 5B easily understandable and similar to FIG. 4A, and detailed explanations of FIG. 5B are omitted.

FIG. 5B shows a case where the position of the write head 10W shifts from the sampled position 404 shown in FIG. 5A to a sampled position 408 of the servo sector S2. At this time, the positioning error β of the write head 10W exceeds the strict threshold value DOL(POS) 406. Therefore, the write is inhibited (WF detected) and the data writing is stopped. In this case, it is not assured that the write head locus falls within the first threshold value DOL(POS) to be made strict until the writing is stopped. Therefore, the data is rewritten from the data area after the servo sector S1, after awaiting the magnetic disk 1 making one round. In the example shown in FIGS. 5A and 5B, each of the sampled positions in the servo sectors S1 and S2 falls within the first threshold value DOL(POS) to be made strict, but the write head locus between the sampled positions in the servo sectors S1 and S2 exceeds the first threshold value DOL(POS) to be made strict.

In the shingled write recording, there is no neighboring data that causes a problem by being erased, on a side of the same direction as the direction of the shingled writing of a track 400 to be written (i.e., a data area side where writing is to be executed). Therefore, even if the write head locus exceeds the first threshold value DOL(POS) to be made strict, a problem that the written data may be broken does not occur.

According to the embodiments, degradation of the performance caused by the write inhibit can be suppressed since the write inhibit determination is eased in a case where the predicted positioning error occurs in the same direction as the direction of the shingled writing. In addition, there is no increase in a risk of contiguous data corruption caused by easing the write inhibit determination.

Figure 6A:
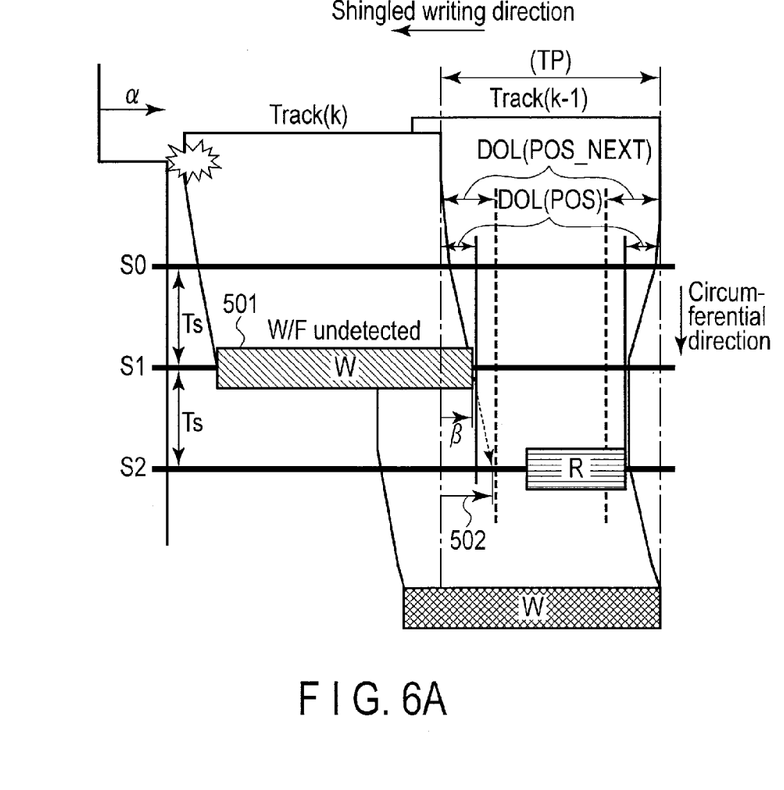
FIG. 6A shows illustrations for explanation of an operation executed when off-track occurs in a shingled writing opposite direction, in the embodiments.
Figure 6B:
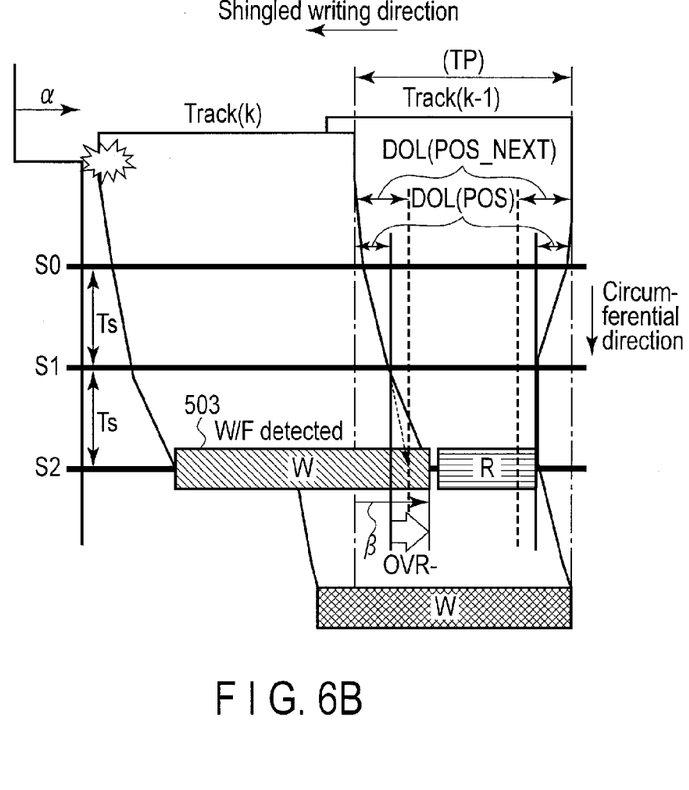
FIG. 6B shows illustrations for explanation of another operation executed when off-track occurs in the shingled writing opposite direction, in the embodiments.

FIGS. 6A and 6B shows illustrations for explanation of an operation executed when off-track occurs in the shingled writing opposite direction, in the embodiments. FIGS. 6A and 6B illustrates situations of executing the shingled writing of the track (k) after writing the track (k−1).

In FIG. 6A, 501 indicates a sampled position of the servo sector S1 in the track (k). When the data is written in the track (k), WF is undetected since the positioning error of the head falls within the first threshold value DOL(POS) and the predicted positioning error 502 previously located by one sample is within DOL(POS_NEXT), at the sample of the servo sector S1.

In FIG. 6B, 503 indicates a sampled position of the servo sector S2 in the track (k). At the sampling of the servo sector S2, WF is detected and the writing is stopped since the positioning error β of the head exceeds the first threshold value DOL(POS).

At this time, the maximum amount of deviation writing from the data track k to the data track k−1 is,

DOL(POS)+OVR−.

In contrast, the amount of deviation writing in the plus direction of the track (k−1)(i.e., the same direction as the shingled writing) is, due to OVR+=0 in the embodiments,

DOL(POS).

Therefore, an inequality in which margin of the track pitch for deviation writing (TPIM) should be met since the data of the track (k−1) can be normally read is expressed as follows.

$$TPIM \geq 2 \times DOL(POS)+OVR- \quad (5)$$

Expression (5) does not include the overrun amount OVR+ in the same direction as the direction of the shingled writing, as compared with expressions (1) and (2). In other words, according to the embodiments, as compared with prior art, the first threshold value DOL(POS) can be set at a great value if the TPIM is the same. Therefore, improvement of the performance of the HDD can be attempted since probability of deciding the write inhibit is lowered. In addition, according to the embodiments, as compared with prior art, track density can be increased since necessary TPIM can be reduced, if the first threshold value DOL(POS) is the same.

Figure 7:
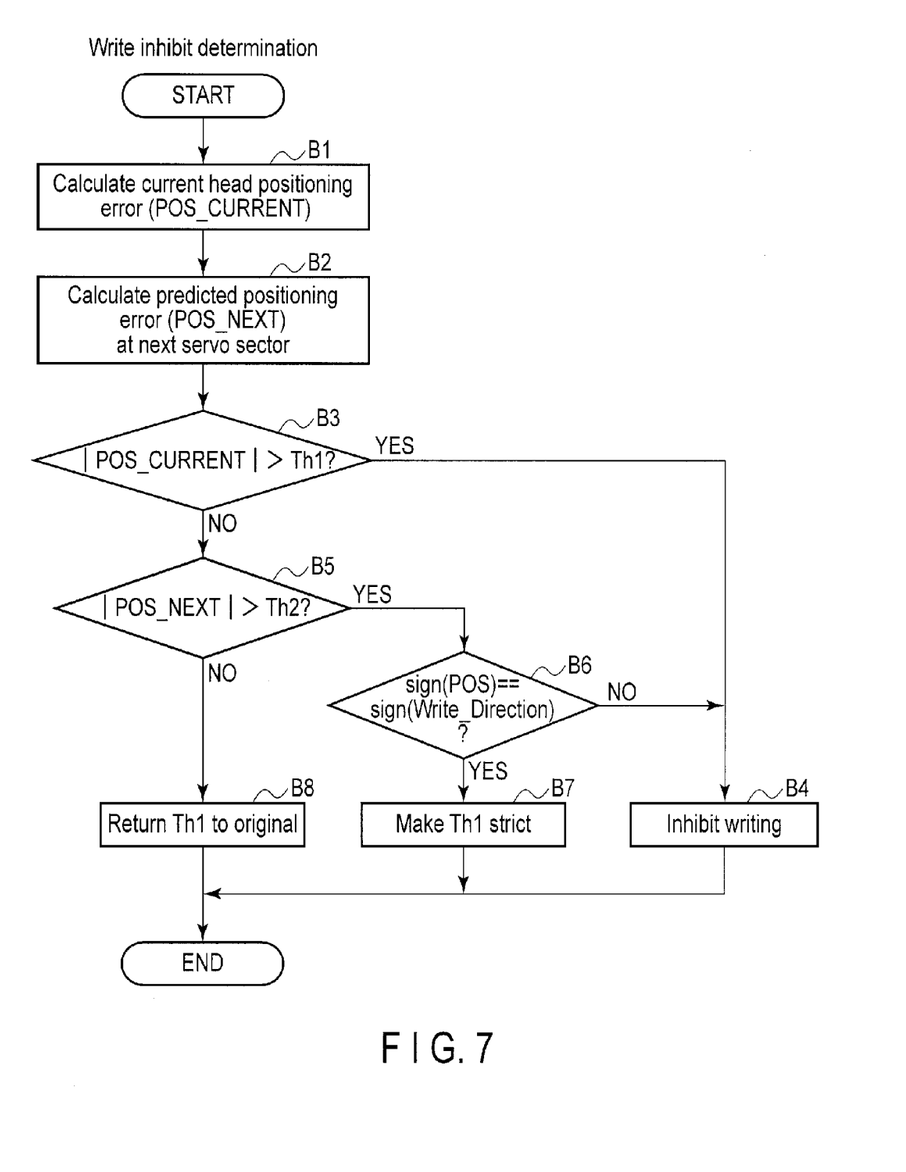
FIG. 7 is a flowchart showing write inhibit determination processing of the embodiments.

FIG. 7 is a flowchart showing the write inhibit determination processing of the embodiments. The determination processing is executed by employing the above-explained first to third write inhibit determination systems. In addition, the determination processing is executed every time the magnetic head 10 passes through each of the servo sectors, at the data write time.

First, the MPU 14 calculates a current head positioning error (POS_CURRENT) (B1). Next, the MPU 14 calculates a predicted positioning error (POS_NEXT) in the next servo sector as explained above, by referring to FIG. 3 (B2).

The MPU 14 determines whether an absolute value |POS_CURRENT| of the current head positioning error is greater than the first threshold value Th1 or not (B3). The first threshold value Th1 corresponds to the above-explained first threshold value DOL(POS). If the absolute value |POS_CURRENT| of the current head positioning error is greater than the first threshold value Th1 (yes in B3), the MPU 14 inhibits the writing (B4). In other words, the MPU 14 transmits a write inhibit command to the write channel 12W and inhibits the write operation.

If the absolute value |POS_CURRENT| of the current head positioning error is equal to or smaller than the first threshold value Th1 (no in B3), the MPU 14 determines whether an absolute value |POS_NEXT| of the predicted positioning error in the next servo sector is greater than the second threshold value Th2 or not (B5). The second threshold value Th2 corresponds to the above-explained second threshold value DOL (POS_NEXT). In general, the second threshold value Th2 is greater than the first threshold value Th1.

If the absolute value |POS_NEXT| of the predicted positioning error in the next servo sector is greater than the second threshold value Th2 (yes in B5), the MPU 14 determines whether a predetermined positioning error direction sign (POS) and the shingled writing direction sign(Write_Direction) are the same as each other or not (B6).

If the predetermined positioning error direction sign(POS) and the shingled writing direction sign(Write_Direction) are the same as each other (yes in B6), the MPU 14 makes the first threshold value Th1 referred to in B3 strict (sets the threshold value to be a small value by a specific amount) (B7). The strict threshold value is used in B3 as the first threshold value Th1 in the write inhibit determination processing in a next servo sector. If the predetermined positioning error direction sign (POS) and the shingled writing direction sign(Write_Direction) are different from each other (no in B6), the MPU 14 inhibits the write (B4).

When the absolute value |POS_NEXT| of the predicted positioning error in the next servo sector is equal to or smaller than the second threshold value Th2 in B5 (no in B5), the MPU 14 returns the first threshold value Th1 to the original value (B8). At this time, When the first threshold value Th1 is not made strict unlike B7, the first threshold value Th1 is not varied.

According to the embodiments, as explained above, degradation of the performance caused by the write inhibit can be suppressed in the HDD of the shingled write recording format.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive, comprising:
   a magnetic disk comprising a plurality of servo areas for detecting a positioning error;
   a magnetic head to write and to read data to and from the magnetic disk; and
   a processor, wherein the processor
   detects a current positioning error of the magnetic head on the magnetic disk, while writing data to tracks of the magnetic disk so as to partially overlap with each other by the magnetic head,
   calculates a predicted positioning error in a next servo area to a current servo area where current positioning error is detected,
   executes write inhibit determination, based on comparison between the current positioning error and a first threshold value, and wherein
   when the current positioning error is equal to or smaller than the first threshold value, when the predicted positioning error is greater than a second threshold value different from the first threshold value, and when a direction of the predicted positioning error is same as a direction of the writing, the processor sets the first threshold value to a smaller value by a specific amount, the smaller value being used as the first threshold value in the write inhibit determination in the next servo area.

2. The magnetic disk drive of claim 1, wherein
   when the current positioning error is equal to or smaller than the first threshold value, when the predicted positioning error is equal to or smaller than the second threshold value, and when the first threshold value is set to a value smaller than an original value, the processor returns the first threshold value to the original value.

3. The magnetic disk drive of claim 1, wherein
   when the current positioning error is greater than the first threshold value, the processor determines the write inhibit.

4. The magnetic disk drive of claim 1, wherein
   when the current positioning error is equal to or smaller than the first threshold value, when the predicted positioning error is greater than the second threshold value, and when the direction of the predicted positioning error is opposite to the direction of the writing, the processor determines the write inhibit.

5. The magnetic disk drive of claim 1, wherein
   the second threshold value is greater than the first threshold value.

6. A write control method in a magnetic disk drive comprising a magnetic disk comprising a plurality of servo areas for detecting a positioning error, and a magnetic head to write and read data to and from the magnetic disk, the method comprising:
   detecting a current positioning error of the magnetic head on the magnetic disk, while writing data to tracks of the magnetic disk so as to partially overlap with each other by the magnetic head;

calculating a predicted positioning error in a next servo area to a current servo area where current positioning error is detected;

executing write inhibit determination, based on comparison between the current positioning error and a first threshold value; and when the current positioning error is equal to or smaller than the first threshold value, when the predicted positioning error is greater than a second threshold value different from the first threshold value, and when a direction of the predicted positioning error is same as a direction of the writing, setting the first threshold value to a smaller value smaller by a specific amount, the smaller value being used as the first threshold value in the write inhibit determination in the next servo area.

7. The write control method of claim 6, further comprising:
when the current positioning error is equal to or smaller than the first threshold value, when the predicted positioning error is equal to or smaller than the second threshold value, and when the first threshold value is set to a value smaller than an original value, returning the first threshold value to the original value.

8. The write control method of claim 6, further comprising:
when the current positioning error is greater than the first threshold value, determining the write inhibit.

9. The write control method of claim 6, further comprising:
when the current positioning error is equal to or smaller than the first threshold value, when the predicted positioning error is greater than the second threshold value, and when the direction of the predicted positioning error is opposite to the direction of the writing, determining the write inhibit.

10. The write control method of claim 6, wherein the second threshold value is greater than the first threshold value.

* * * * *